US010065615B2

(12) United States Patent
Sala et al.

(10) Patent No.: US 10,065,615 B2
(45) Date of Patent: Sep. 4, 2018

(54) SIMULATION DEVICE FOR AN ELECTRONICALLY CONTROLLED BRAKING APPARATUS (BBW), AND METHOD OF APPLYING A CONTRAST ACTION

(71) Applicant: FRENI BREMBO S.P.A., Curno, Bergamo (IT)

(72) Inventors: Paolo Sala, Curno (IT); Riccardo Arrigoni, Curno (IT); Beniamin Szewczyk, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 14/392,380

(22) PCT Filed: Sep. 4, 2014

(86) PCT No.: PCT/IB2014/064257
§ 371 (c)(1),
(2) Date: Mar. 4, 2016

(87) PCT Pub. No.: WO2015/033292
PCT Pub. Date: Mar. 12, 2015

(65) Prior Publication Data
US 2016/0236663 A1 Aug. 18, 2016

(30) Foreign Application Priority Data

Sep. 6, 2013 (IT) .............................. BS2013A0123

(51) Int. Cl.
*B60T 15/16* (2006.01)
*B60T 8/40* (2006.01)
(Continued)

(52) U.S. Cl.
CPC .............. *B60T 8/409* (2013.01); *B60T 7/042* (2013.01); *B60T 7/06* (2013.01); *B60T 8/3255* (2013.01);
(Continued)

(58) Field of Classification Search
CPC ........ B60T 8/409; B60T 8/3255; B60T 7/042; B60T 8/4086; B60T 2220/04; B60T 7/06;
(Continued)

(56) References Cited

U.S. PATENT DOCUMENTS

| 5,421,643 A | 6/1995 | Kircher et al. |
| 5,551,764 A | 9/1996 | Kircher et al. |

(Continued)

FOREIGN PATENT DOCUMENTS

| DE | 4239386 A1 | 5/1994 |
| DE | 102010038555 A1 | 2/2012 |

(Continued)

OTHER PUBLICATIONS

European Patent Office, International Search Report and Written Opinion of PCT/IB2014/064257, dated Jan. 7, 2015, 10 pages, European Patent Office, Rijswijk, Netherlands.

(Continued)

*Primary Examiner* — Pamela Rodriguez
(74) *Attorney, Agent, or Firm* — Marshall & Melhorn, LLC.

(57) ABSTRACT

A simulation device for an electrically controlled braking apparatus of a vehicle with an electric motor having a motorized axis slant in relation to the translation axis of the strut of the pedal group, a contrast body connected to the strut, a main abutment wall and an elastic contrast element, disposed between the main abutment wall and the contrast body. The method of applying the contrast action to the pedal provides for activating, when the flattening action of the pedal by the user is terminated, the motor to achieve an (Continued)

inactive configuration in which the useful distance of maximum compression of the elastic contrast element is minimal.

9 Claims, 6 Drawing Sheets

(51) Int. Cl.
 B60T 7/04 (2006.01)
 B60T 7/06 (2006.01)
 B60T 8/32 (2006.01)
 B60T 13/66 (2006.01)
 B60T 13/74 (2006.01)
(52) U.S. Cl.
 CPC .......... B60T 8/4081 (2013.01); B60T 8/4086 (2013.01); B60T 13/662 (2013.01); B60T 13/74 (2013.01); B60T 2220/04 (2013.01); B60T 2220/06 (2013.01); B60W 2540/12 (2013.01)
(58) Field of Classification Search
 CPC ...... B60T 8/4081; B60T 13/662; B60T 13/74; B60T 2220/06; B60T 2540/12
 USPC .............. 303/13, 3, 15, 20, 113.4, 155, 158, 303/DIG. 3; 188/156, 158, 162; 74/478
 See application file for complete search history.

(56) References Cited

U.S. PATENT DOCUMENTS

| | | | | |
|---|---|---|---|---|
| 5,927,825 A | * | 7/1999 | Schenk | B60T 8/4081 303/113.5 |
| 6,105,737 A | * | 8/2000 | Weigert | B60T 7/042 188/156 |
| 6,684,987 B2 | | 2/2004 | Stachowski et al. | |
| 7,357,465 B2 | | 4/2008 | Young et al. | |
| 8,672,808 B2 | | 3/2014 | Nishino et al. | |
| 8,899,696 B2 | | 12/2014 | Weiberle et al. | |
| 8,997,482 B2 | | 4/2015 | Richard et al. | |
| 9,061,673 B2 | | 6/2015 | Weiberle et al. | |
| 9,267,377 B2 | | 2/2016 | Weiberle et al. | |
| 2002/0158510 A1 | * | 10/2002 | Kobayashi | B60T 8/3265 303/155 |
| 2006/0163941 A1 | | 7/2006 | Von Hayn et al. | |
| 2012/0198959 A1 | | 8/2012 | Leiber et al. | |

FOREIGN PATENT DOCUMENTS

| | | |
|---|---|---|
| DE | 102010042694 A1 | 2/2012 |
| DE | 102012000258 A1 | 7/2012 |
| EP | 2163445 A2 | 3/2010 |
| KR | 20040079701 A | 9/2004 |
| WO | 2004005095 A1 | 1/2004 |
| WO | 2011026804 A1 | 3/2011 |
| WO | 2011098178 A1 | 8/2011 |

OTHER PUBLICATIONS

European Patent Office, Italian Search Report issued in IT Application No. BS2013A000123, dated Apr. 3, 2014, with detailed citation listing, 5 pages, European Patent Office, Munich, Germany.

* cited by examiner

SIMULATION DEVICE FOR AN ELECTRONICALLY CONTROLLED BRAKING APPARATUS (BBW), AND METHOD OF APPLYING A CONTRAST ACTION

BACKGROUND OF THE INVENTION

The object of the present invention is a simulation device for an electrically controlled braking apparatus (usually called Brake-by-Wire or BBW apparatus).

As is known, in vehicles provided with electrically controlled braking apparatus, the movement that the pedal carries out under the action of the user's foot is used to generate an input signal for the control of the electric motors intended to carry out the braking; the contrast action to the movement on the pedal, which in traditional apparatus is exerted by the fluid pressure, is therefore missing.

The flattening of the pedal would therefore be free, with considerable difficulty by the user in regulating the braking, because the feedback from the pedal towards the user would be missing.

For this reason, it is known to use a braking simulation device which, according to different modes, exerts on the pedal a contrast action to the free flattening of the pedal.

Several solutions of braking simulation devices are known.

According to a first known solution, for example, described in document U.S. Pat. No. 7,357,465, the simulation device is mechanical and is provided with some springs that exert the contrast action on the pedal.

However, the simulation devices of the mechanical type have the drawback of providing a predetermined contrast action, which may not meet the needs of a user, especially if particularly demanding.

According to a further known solution, for example described in document KR 20040079701, the simulation device is electro-mechanical and provides a gear motor and a spring resting on a plate movable by the gear motor, in which the gear motor is in axis with the flattening direction of the pedal and the spring compression. The action of the gear motor, changing the position of the plate, changes the response of the spring and thereby the contrast action exerted thereby.

However, the known solution has the drawback of having to provide for an adequate dimensioning of the motor and of the supports, since it must withstand the maximum load applicable to the pedal.

According to a still further known solution, for example described in document U.S. Pat. No. 6,684,987, the simulation device is of the electric type and includes a gear motor acting on the pedal, arranged with slant axis with respect to the flattening direction of the pedal.

This solution, too, has drawbacks, such as the slow response of the simulation device to the flattening action of the pedal exerted by the user.

The object of the present invention is to provide a simulation device for an electronically controlled braking apparatus (BBW) which overcomes the drawbacks mentioned with reference to the prior art.

Such an object is achieved by a simulation device made according to the following claim 1. The dependent claims describe embodiment variations.

BRIEF DESCRIPTION OF THE DRAWINGS

The features and advantages of the simulation device according to the present invention will appear more clearly from the following description, made by way of an indicative and non-limiting example with reference to the following figures, in which.

DETAILED DESCRIPTION OF THE INVENTION

Figure 1:
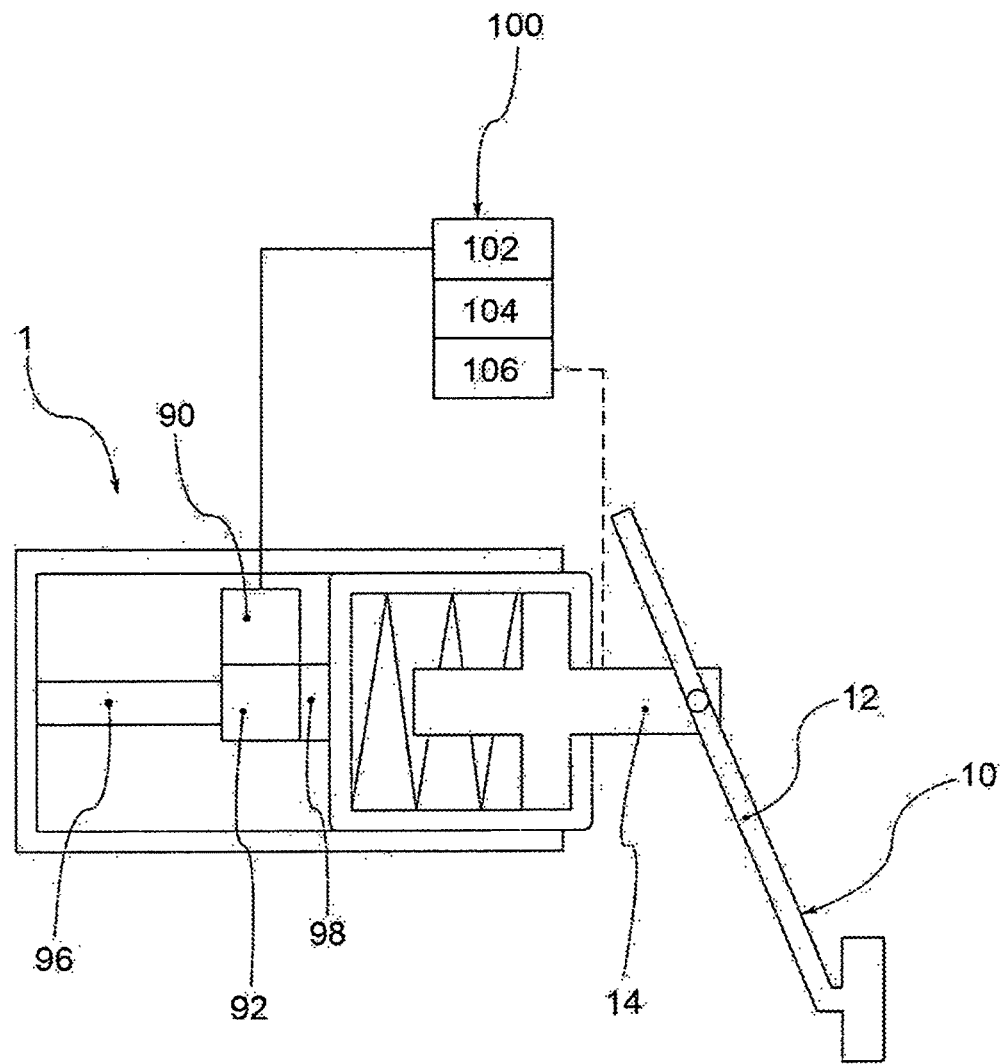
FIG. 1 shows a diagram of a simulation device according to an embodiment of the present invention.

With reference to the accompanying figures, reference numeral 1 generally indicates a simulation device for an electrically controlled braking apparatus (BBW) for a vehicle, connected to a pedal group 10 operable by a user.

The pedal group 10 includes a pedal 12, operable by the user, and a strut 14, integral with pedal 12, translatable, when pedal 12 is flattened, along a translation axis X. Strut 14 is mechanically engaged with the simulation device 1.

According to a preferred embodiment, the simulation device 1 comprises a support group 30, integral with a fixed wall of the vehicle, for example hinged thereto, to angularly accommodate strut 14.

The support group 30, which preferably consists of a frame or a closed casing, comprises a support wall 32, for example arranged on the side opposite to strut 14, and guide means, for example comprising at least one guide wall 34 of a flange 35, on the same side as strut 14.

According to an embodiment variant, the support group is integrated in the vehicle chassis or components thereof, in order to generate the necessary constraint reactions.

The support group 30 has an inner compartment 36.

The simulation device 1 further comprises a mobile group 40, slidingly supported by the support group 30, preferably accommodated in the inner compartment 36 thereof.

The mobile group 40 is translatable on command along the translation axis X and guided in translation by said guide means, for example sliding on said guide wall 34.

Preferably, the mobile group 40 comprises a main casing 42, for example consisting of a bush 44 axially flanked, on the one hand and on the other, by a proximal half-shell 46 and a distal half-shell 48, sealingly connected with said bush 44.

The main casing 42 internally comprises:

a base 50, axially perforated in a through manner, for example belonging to the proximal half-shell 46;

a main abutment wall 52, axially spaced from base 50, for example belonging to bush 44;

preferably, a secondary abutment wall 54, axially spaced from the main abutment wall, for example belonging to bush 44; and an abutment wall 56, for example still belonging to bush 44, adapted to form an axial abutment.

The simulation device 1 also comprises a contrast body 60, having extension along the translation axis X between a proximal end 62 and an opposite distal end 64, movable on command with respect to the main casing 42 and preferably at least partially accommodated therein. For example, the contrast body 60 passes axially through base 50 of casing 40 and is driven in translation thereby.

In addition, the contrast body 60 is engaged with the proximal end 62 of strut 14 of the pedal group 10.

Preferably, moreover, the contrast body 60 comprises a shoulder 66 having such a radial extension as to form an abutment against base 50 of casing 40, so as to avoid the complete exit of the contrast body 60 from said casing.

The mobile group 40 further comprises at least one elastic element 70, on one side in abutment with the main abutment wall 52 of bush 44, and on the other engageable with the contrast body 60, for influencing it towards the abutment with the main base 50 of the main casing 42.

According to one embodiment, the elastic element comprises a plurality of facing cup springs; according to a further embodiment (not shown), the elastic element comprises at least one helical spring.

Preferably, when the contrast body 60 is in abutment with base 50, the contrast body 60 is disengaged from said elastic contrast, elements 70, kept in position by an elastic ring 72.

Preferably, moreover, the mobile group 40 comprises at least one elastic return element 80, on one side in abutment with the secondary abutment wall 54 and on the other permanently engaged with the contrast body 60, for influencing it towards the abutment with base 50.

For example, the elastic return elements 80 and the elastic contrast elements 70 are concentrically accommodated in bush 44.

In particular, according to one embodiment, the elastic return elements 80 are arranged radially internally to the elastic contrast elements 70; according to a further embodiment (not shown), the elastic return elements are arranged radially externally to the elastic contrast elements.

The simulation device 1 also comprises motorised movement means activated to move the mobile group 40.

Said movement means comprise an electric motor 90, for example of the DC brushless type or DC brush type having a driving shaft with motorised axis Z.

According to one embodiment, the movement means further comprise a worm screw 92, having a rotation axis coaxial with the motorised axis Z of motor 90, and a transmission element 94, for example a toothed bush, engaged with the worm screw 92, arranged with rotation axis slant in relation to the rotation axis of the worm screw 92, for example at 90° relative thereto. The rotation axis of the transmission element 94 is coincident with the translation axis X of strut 14.

Motor 90 therefore has motorised axis Z slant in relation to the translation axis X, preferably at 90° relative thereto.

The transmission element 94 is adapted to influence the mobile group 40 to cause the movement, for example by operating axially on the abutment wall 56 of bush 44.

Preferably, between the transmission element 94 and the abutment wall 56, there is arranged a thrust bearing 98, for example sliding or rolling, of said movement means, for the transfer of the thrust from the mobile group 40 to the transmission element 94 and vice versa.

Moreover, the movement means comprise a movement screw 96, which extends along the translation axis X, for example provided with trapezoidal thread, connected to the support group 30, for example to the support wall 32 thereof, fixed during the movement of the mobile group 40.

The movement screw 96 is engaged with the transmission element 94, for example within the toothed bush.

Motor 90, the worm screw 92 and the transmission element 94 are therefore on board the mobile group 40.

The simulation device 1 also comprises electronic managing means 100 of motor 90, for example a CPU, comprising electronic control and operating means 102 of motor 90, recording means 104, adapted to store some operating parameters of the braking apparatus, for example relating to the desired rigidity of said apparatus, and detection means 106 adapted to detect some status parameters of the braking apparatus and transmit a corresponding signal to the control and operating means. For example, the detection means 106 comprise a sensor adapted to detect the configuration of the pedal group 10, for example the position of pedal 12 or strut 14 or the flattening speed of the pedal by the user.

For managing the simulation device 1, according to an embodiment, the managing means 100, based on the desired rigidity and on the position detected for the pedal, control the operation of motor 90, modifying the contract action acting on pedal 12.

Figure 2:
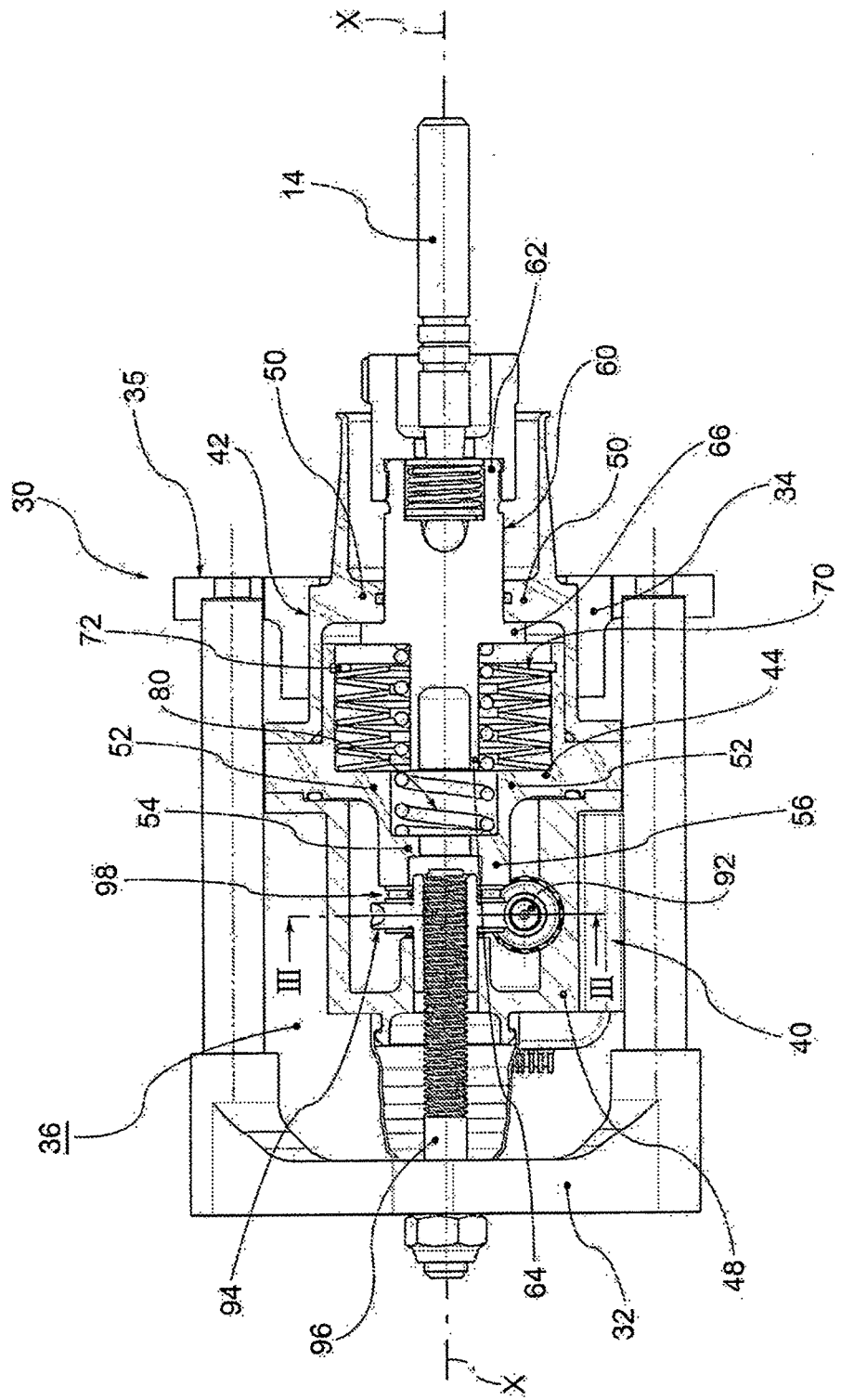
FIG. 2 shows a cross-section of the simulation device according to the diagram in FIG. 1, in an inactive configuration, with pedal at rest.
Figure 3:
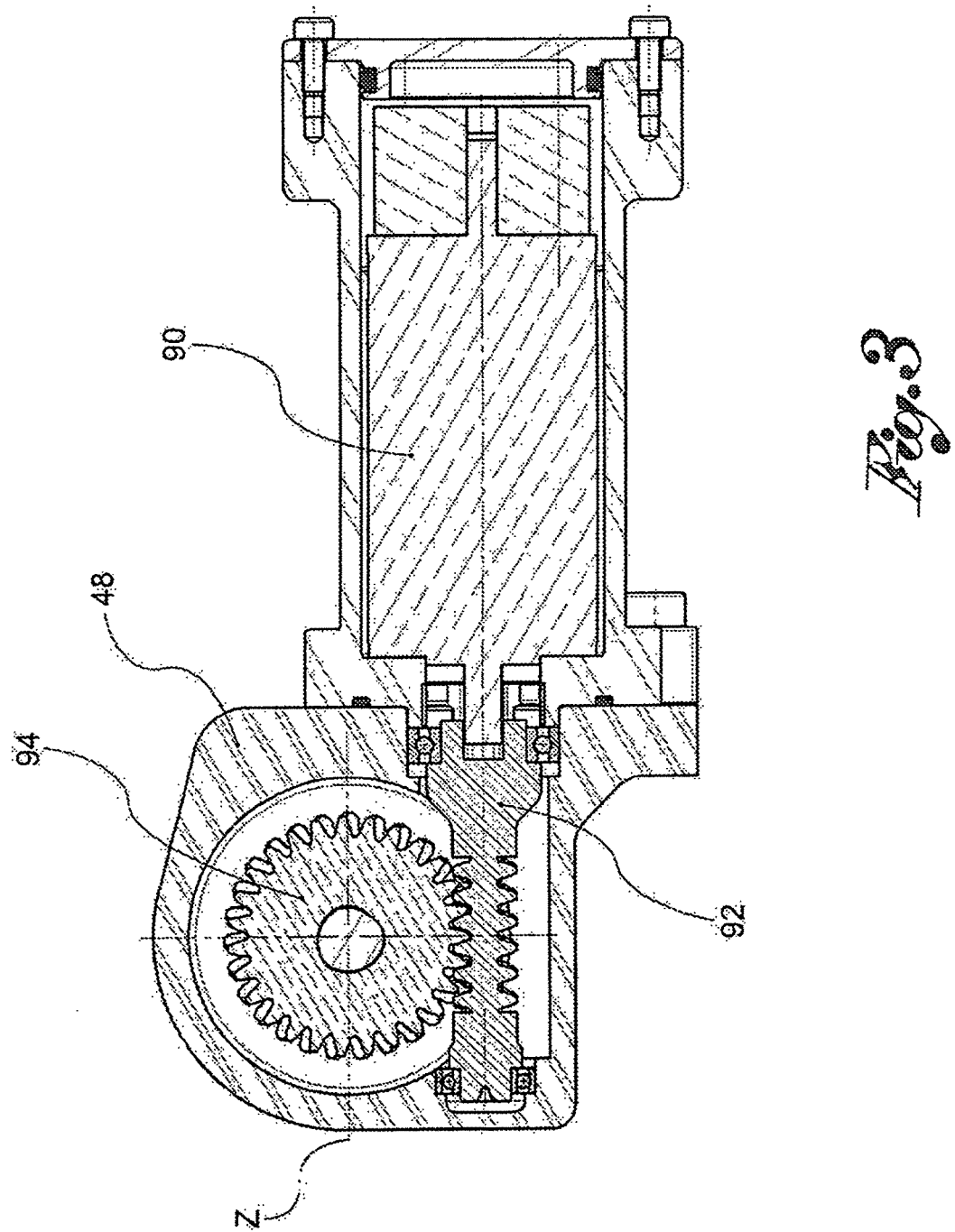
FIG. 3 shows a section of the simulation device in FIG. 2, according to the section line III-III in FIG. 2.

In an inactive configuration (FIG. 2), the transmission element 94 is placed in an advanced limit position on the movement screw 96 and correspondingly, the main abutment wall 52 of the mobile body 40 is in the advanced limit position.

In this configuration, for a predetermined stroke of the contrast body 60, the contrast action exerted by the contrast elements 70 on said contrast body 70 is high, since the useful distance of compression of the elastic contrast elements 70, i.e. the distance between shoulder 66 of body 60 and the main abutment wall 52 is reduced.

With pedal at rest (FIG. 2), the contrast body 60 is in the limit rest position, wherein it is in abutment with base 50 of the mobile group 40, held in that position by the permanent action of the elastic return element 80.

Figure 4:
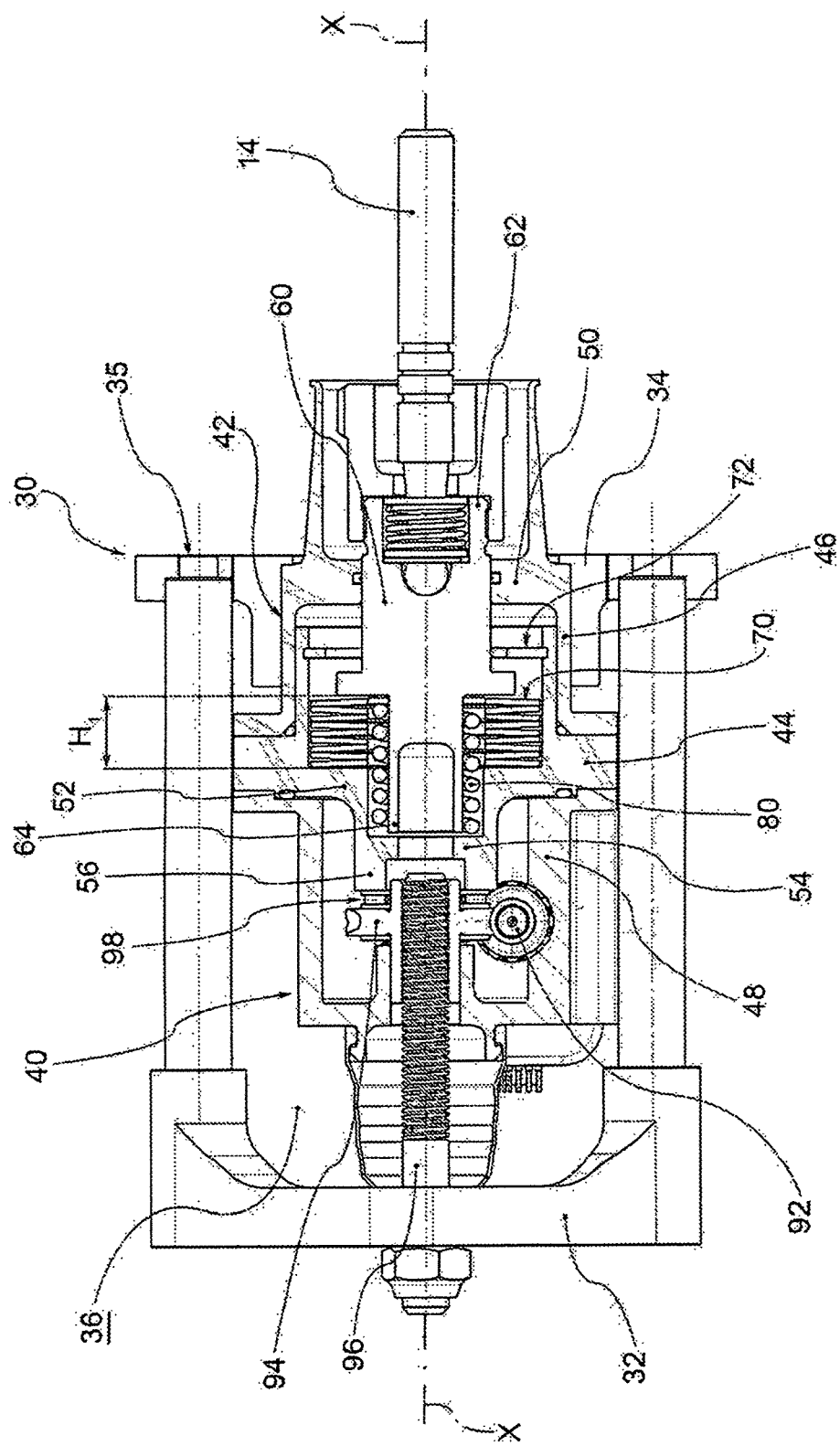
FIG. 4 shows the simulation device in FIG. 2, in an inactive configuration, with the pedal in a limit flattening position.

In the inactive configuration, but with pedal in the limit flattening condition (FIG. 4), the contrast body 60 is in the limit flattening position, in which it has brought in compression the elastic contrast elements 70 for a useful distance H1 for the maximum compression of the elastic contrast elements 70.

Figure 5:
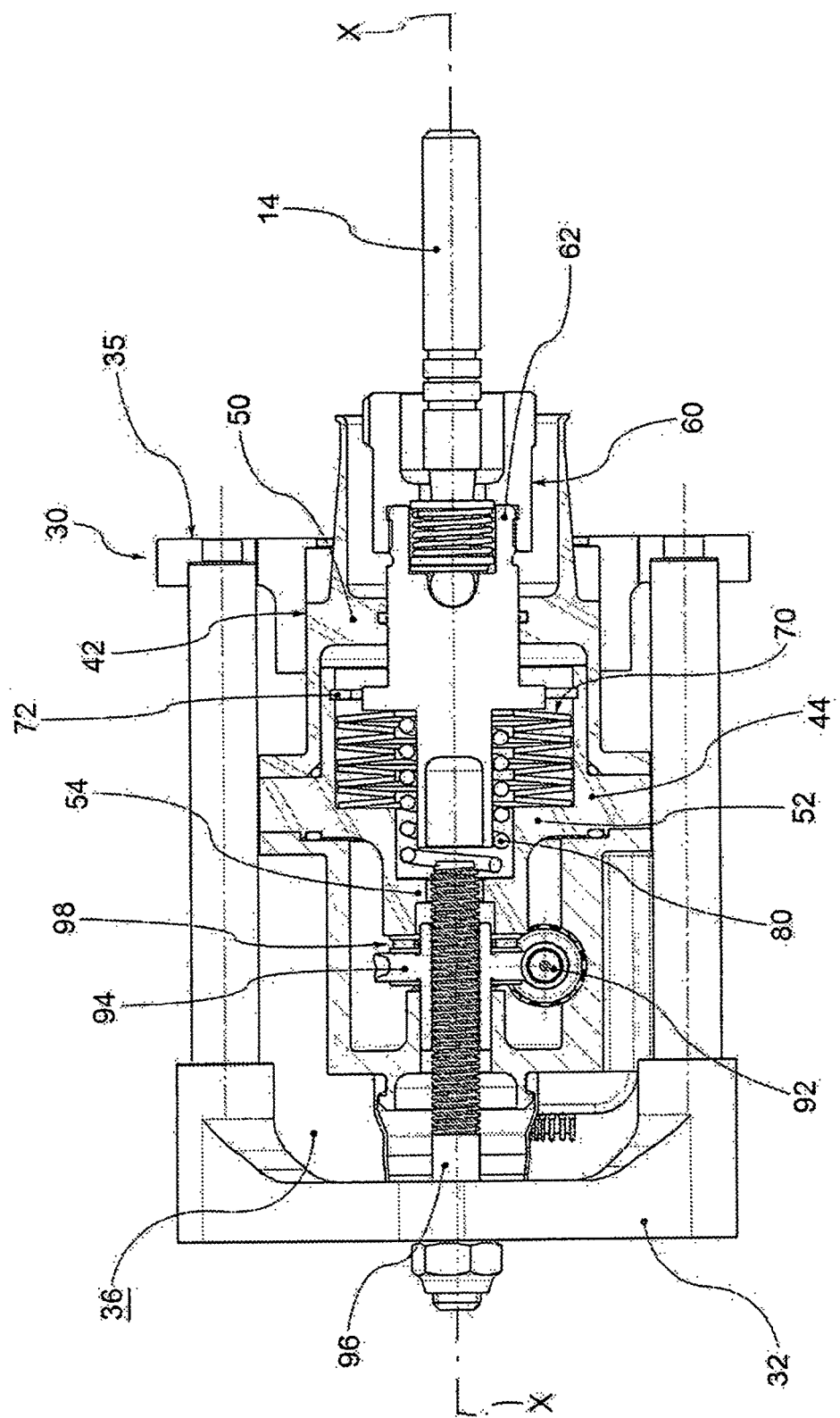
FIG. 5 shows the simulation device in FIG. 2, in an intermediate operating configuration, with the pedal in an intermediate flattening position.

In an intermediate operating configuration (FIG. 5), the transmission element 94 is in an intermediate position, set back from the advanced limit position on the movement screw 96, and likewise is the main abutment wall 52.

With the pedal in an intermediate flattening position (FIG. 5), the contrast body 60 is in an intermediate position, in which it is influenced by the elastic contrast elements 70 (together with the elastic return elements 80), which carry out the contrast action thereon.

Figure 6:
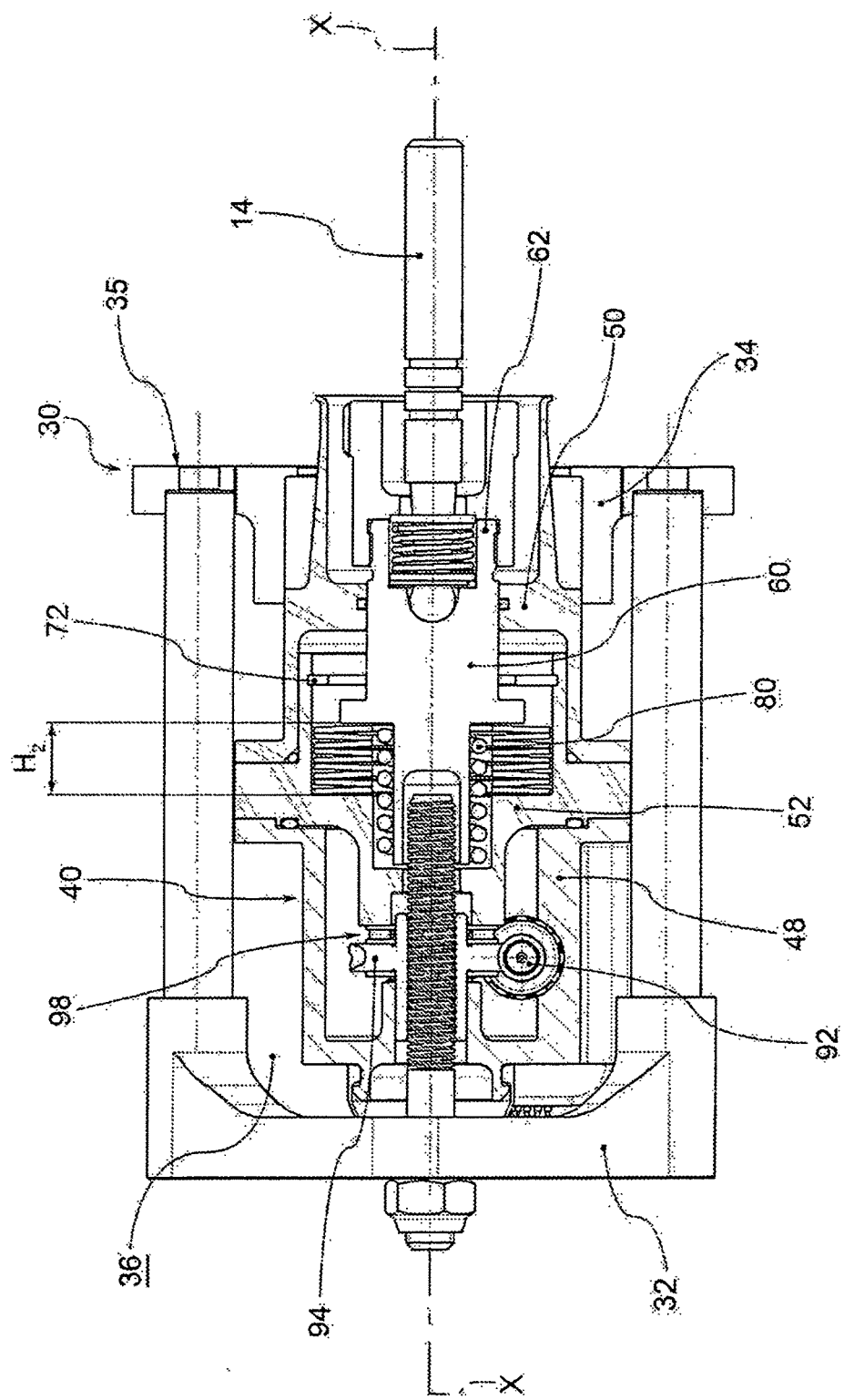
FIG. 6 shows the simulation device in FIG. 2, in a limit operating configuration, with the pedal in the limit flattening position.

In a limit operating configuration (FIG. 6), the transmission element 94 is placed in a'retracted limit position on the movement screw 96 and correspondingly, the main abutment wall 52 of the mobile body 40 is in the retracted limit position.

In this configuration, the rigidity felt on the pedal is reduced, since the useful compression distance is increased.

In the limit operating configuration, but with pedal in the limit flattening condition (FIG. 6), the contrast body 60 is in the limit flattening position, in which it has brought in compression the elastic contrast elements 70 with a useful distance H2 for the maximum compression of the elastic contrast elements 70 greater than the useful distance H1 of the rest configuration of the active operation. The rigidity felt on the pedal is therefore less than the rigidity in the inactive configuration and pedal in limit flattening position.

With the pedal at rest, the simulation device 1 is normally in the inactive operating configuration.

Furthermore, the management of the motor is defined so that, if the user abruptly flattens the pedal (and hence the speed detected for the pedal or the strut is greater than a predefined threshold value), since he/she needs a rapid braking (the so-called "panic braking"), the motor does not intervene so that the device remains in the inactive configuration. The behaviour of the device will therefore be very rigid.

If the flattening of the pedal is instead softer (and therefore the speed detected for the pedal or the strut is less than a preset threshold value), the motor intervenes, bringing the device from the inactive configuration to the limit operating configuration. The behaviour of the device will therefore be less rigid.

When the user terminates the flattening and starts releasing the pedal, the motor is operated to return the device to the inactive configuration.

Innovatively, the simulation device according to the present invention allows overcoming the drawbacks of the prior art in that the action, often very abrupt, with which the user acts on the pedal, is relieved on the motor and at the same time, also in case of panic braking, when the user acts on the pedal suddenly in an attempt to brake immediately, the response of the simulation device is rapid, because the motor does not intervene.

In particular, advantageously, the action of the user on the pedal is relieved on the bush and therefrom on the bearing, on the transmission element, on the movement screw and finally on the support group, without the motor being involved.

Advantageously, moreover, in case of a panic braking, the contrast action is immediately developed by the elastic contrast elements, without any intervention of the motor, so the response of the device is extremely rapid and rigid.

Advantageously, moreover, the reliability of the device is high and the wear of the motorised parts low, since the motor never works against the flattening action of the user.

It is clear that a man skilled in the art can make changes to the simulation device described above in order to meet incidental needs, all falling within the scope of protection defined in the following claims.

The invention claimed is:

1. A simulation device for an electrically controlled braking apparatus for a vehicle,
wherein said device is connectable to a pedal group comprising a pedal and a strut moveable with the pedal and translatable by flattening of the pedal by a user, said device comprising:
a contrast body translatable with the strut of the pedal group, translatable along a translation axis;
a mobile group provided with a main abutment wall;
at least one elastic contrast element, positioned between the main abutment wall and the contrast body, so as to be compressible between them;
a movement structure of the mobile group suitable for being activated to achieve the translation of the mobile group, comprising:
 a) an electric motor having a motorised axis slanted in relation to the translation axis;
 b) a rotatable transmission element, controllable by the motor, having a rotation axis coinciding with the translation axis;
 c) a movement screw, attachable to a vehicle wall, extending along the translation axis, on which the transmission element is engaged;
said transmission element being suitable to act on the mobile group to obtain a translation thereof, thus modifying the position of the main abutment wall with respect to the contrast body.

2. The simulation device according to claim 1, wherein the movement structure comprises a worm screw, having a rotation axis coaxial to the motorised axis of the motor and joined in rotation thereto, engaged with the transmission element.

3. The simulation device according to claim 2, wherein between the transmission element and an abutment wall of the mobile group a thrust bearing is positioned.

4. The simulation device according to claim 2, wherein the movement structure, when the flattening of the pedal by the user is terminated, are suitable for bringing the device into an inactive configuration in which the useful distance for the maximum compression of the elastic contrast element is minimal.

5. The simulation device according to claim 1, wherein the movement screw has a trapezoidal thread.

6. The simulation device according to claim 1, wherein the motor and the transmission element are on board the mobile group.

7. The simulation device according to claim 1, further comprising an electronic managing structure of the motor comprising electronic control and operating structure of the motor, recording structure, suitable for recording several functioning parameters of the braking apparatus, and detection structure suitable for detecting several status parameters of the pedal group, such as the position or the speed of flattening the pedal or the strut.

8. The simulation device according to claim 1, wherein the contrast body comprises a shoulder having a radial extension such as to form an abutment against a base of the mobile group.

9. The simulation device according to claim 1, further comprising at least one elastic return element which permanently presses the contrast body away from the elastic contrast element.

\* \* \* \* \*